(12) United States Patent
Ring

(10) Patent No.: US 6,430,148 B1
(45) Date of Patent: Aug. 6, 2002

(54) MULTIDIRECTIONAL COMMUNICATION SYSTEMS

(75) Inventor: Steven Richard Ring, Bristol (GB)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 09/219,247

(22) Filed: Dec. 22, 1998

(30) Foreign Application Priority Data

Dec. 22, 1997 (GB) .............................................. 9727034

(51) Int. Cl.⁷ ................................................. H04L 9/00

(52) U.S. Cl. ........................ 370/208; 370/203; 370/210; 370/503; 370/509; 370/464; 375/132; 375/364; 375/354; 375/362; 359/124; 359/145

(58) Field of Search ................................. 370/203, 206, 370/210, 330, 252, 342, 491, 464, 208, 468, 503; 375/132, 367, 260, 340, 364, 354, 362; 359/124, 145

(56) References Cited

U.S. PATENT DOCUMENTS

| | | | |
|---|---|---|---|
| 5,228,025 A | | 7/1993 | LeFloch et al. |
| 5,416,801 A | * | 5/1995 | Chouly et al. ............... 375/260 |
| 5,471,464 A | * | 11/1995 | Ikeda .......................... 370/19 |
| 5,479,396 A | * | 12/1995 | Kusano ........................ 370/16 |
| 5,479,447 A | * | 12/1995 | Chow et al. ................. 375/260 |
| 5,559,833 A | | 9/1996 | Hayet |
| 5,608,764 A | * | 3/1997 | Sugita et al. ................ 375/344 |
| 5,652,772 A | * | 7/1997 | Isaksson et al. ............. 375/367 |
| 5,687,165 A | | 11/1997 | Daffara et al. |
| 5,710,766 A | * | 1/1998 | Schwendeman ............ 370/329 |
| 5,812,523 A | * | 9/1998 | Isaksson et al. ............ 370/208 |
| 5,867,478 A | * | 2/1999 | Baum et al. ................. 370/203 |
| 5,889,759 A | * | 3/1999 | McGibney et al. ......... 370/207 |
| 5,909,436 A | * | 6/1999 | Engstrom et al. ........... 370/343 |
| 5,933,454 A | * | 8/1999 | Cioffi ........................... 375/260 |
| 5,956,318 A | * | 9/1999 | Saeki .......................... 370/206 |
| 6,005,893 A | * | 12/1999 | Hyll ............................ 375/260 |

(List continued on next page.)

FOREIGN PATENT DOCUMENTS

| | | |
|---|---|---|
| EP | 0730357 A2 | 2/1996 |
| EP | 0772332 A2 | 4/1996 |
| EP | 0760564 A2 | 7/1996 |
| GB | 2285902 A | 9/1993 |
| GB | 2283879 A | 10/1994 |
| WO | SE9400560 | 6/1994 |
| WO | SE9500771 | 6/1995 |

OTHER PUBLICATIONS

Special Issue on "Multi–Carrier Modulation," Jean–Paul Linnartz, Philips Research, and Shinsuke Hara, Osaka University and Delft University of Technology, http://diva.eecs.berkeley.edu/~linnartz/issue.html.*

*Primary Examiner*—Douglas Olms
*Assistant Examiner*—Van Kim T. Nguyen
(74) *Attorney, Agent, or Firm*—Christopher P. Maiorana, PC

(57) ABSTRACT

In a multi-directional orthogonal frequency division modulation (OFDM) communication system, for example, on a digital subscriber line, an uplink channel is provided by a first group of the OFDM sub-channels (sub-carriers), and a downlink channel is provided by a second group of the OFDM sub-channels (sub-carriers). In one aspect, communication efficiency is improved by controlling the relative number of sub-channels allocated to each group, and hence controlling the capacity of the channels dynamically. Preferably, the relative capacities are controlled in response to demand for channel capacity. In another aspect, the orthogonality of the sub-carriers generated by different transmitters is improved by providing a frequency and/or time synchronizing signal for providing reference frequency and timing. In a further aspect, multiplex communication over a network between three or more stations is provided by distributing the OFDM sub-channels (sub-carriers) between the stations to provide three or more channels within the OFDM bandwidth.

19 Claims, 5 Drawing Sheets

U.S. PATENT DOCUMENTS

| | | | | |
|---|---|---|---|---|
| 6,081,697 A | * | 6/2000 | Haartsen | 455/109 |
| 6,125,124 A | * | 9/2000 | Junell et al. | 370/503 |
| 6,169,751 B1 | * | 1/2001 | Shirakata et al. | 370/480 |
| 6,175,550 B1 | * | 1/2001 | Van Nee | 370/206 |
| 6,185,257 B1 | * | 2/2001 | Moulsley | 375/260 |
| 6,219,333 B1 | * | 4/2001 | Ahn | 370/203 |

* cited by examiner

MULTIDIRECTIONAL COMMUNICATION SYSTEMS

FIELD OF THE INVENTION

The present invention relates to a multi-directional communication system, such as a duplex system. Such a system may, for example, be used for data communication using modem links over a subscriber line, network, or other communication link. The invention is particularly suitable for implementation using conventional wire links, but the invention is equally applicable to other communication mediums, for example, wire-less links and optical fibre links.

BACKGROUND OF THE INVENTION

A number of data transmission techniques have been developed with the aim of providing high speed communication over existing communication mediums, for example, a subscriber line. Examples include Integrated Services Digital Network (ISDN) and Asymmetric Digital Subscribers Line (ADSL). ISDN provides full duplex communication with the same capacity in either direction of communication. ADSL provides asymmetric capacities (for example, for applications such as Internet access in which more information is expected to flow in one direction than the other).

Reference is made to U.S. Pat. No. 5,668,802 which describes a high speed digital subscriber line employing discrete multiple tone (DMT) signals. DMT is an example of orthogonal frequency division multiplexing, in which the signal on the line consists of encoded multiple harmonic carriers, each carrier representing a "communication channel". The carriers are modulated with a signal representing a time-varying data frame in a discrete frequency domain. The capacity of the line in either direction is fixed; a first group of the channels (e.g. the odd numbered channels) are used exclusively for communication in one direction, and a second group of the channels (e.g. the even numbered channels) are used exclusively for communication in the other direction.

In devising the present invention, it has been appreciated that the above techniques, which employ fixed data rates in either direction, can only use the communication system efficiently when the demand in each direction closely matches the respective data rate capacity fixed for that direction. If the demand in either direction does not match that provided by the communication link, the efficiency of communication may be significantly reduced, since redundant capacity in one direction is not usable to increase capacity in the other direction. Not only does this result in increased communication time (and the consequent increased expense of, for example, a subscriber line), it can also require the need for expensive large buffers to accommodate temporary buffering of data bottlenecking while awaiting transmission.

SUMMARY OF THE INVENTION

In contrast to the prior art technique discussed above, in which channels are permanently reserved for information communication in specific directions, one aspect of the present invention is to enable control of the relative capacities of first and second channels for a multidirectional communication system by controlling the relative number of sub-channels (from a communication band) allocated to each channel.

The term "channel" is used herein in a broad sense to denote a stream of information being carried by one or more information carrying sub-channels representing the channel.

Preferably, the allocation is controllable dynamically, such that the relative capacities of the channels can be varied, for example, to suit temporal demand for communication capacity in each channel.

With this aspect of the invention, the efficiency of multidirection communication can be improved significantly by enabling redundant capacity in one channel to be used to increase the capacity of another channel when demand for capacity in that other channel is high. For example, in times of heavy capacity demand in the first channel, the capacity of the first channel relative to the second channel can be increased by allocating more sub-channels to the first channel than to the second. Likewise, in times of heavy demand in the second channel, the capacity of the second channel can be increased relative to the first by allocating (or re-allocating) a greater number of sub-channels to the second channel.

Preferably, the capacity is dependent on the number of sub-channels allocated to the channel, the capacity increasing with a greater number of available sub-channels.

The determination of capacity demand for each channel can be made in a number of ways, for example, by monitoring the whether the "live" traffic in each channel matches the current channel capacity, or by monitoring the size of input buffer files for data awaiting transmission to each channel.

Preferably, the communication system employs multi-carrier modulation. Preferably, each carrier corresponds to a sub-channel of the communication band.

More preferably, the system employs orthogonal frequency division modulation (OFDM) in which the carriers (also referred to as sub-carriers) are separated in frequency by the baud rate of the modulation (or by a multiple thereof) such that the sub-carriers are theoretically independent. Most preferably, the system employs coded orthogonal frequency division multiplexing (COFDM) in which one or more redundant coding techniques are used to enable at least limited error correction.

In a closely related aspect, the invention provides apparatus for use in a multidirectional communication system for enabling control of the relative capacities of first and second communication channels by controlling the relative number of sub-channels allocated for each channel.

In a further closely related aspect, the invention provides a method of operating a multi-directional communication system, the method comprising controlling the relative capacities of first and second channels in the system by controlling the relative number of sub-channels allocated to each channel.

In a yet further aspect, the invention provides a multidirection communication system including means for controlling the relative capacities of first and second channels thereof in response to the demand for capacity for at least one of the channels. Preferably, the control means is operable to vary the relative capacities in response to changes in the demand.

Preferably, the relative capacities are controlled in response to the demand for capacity for each channel.

Preferably, the system comprises means for determining the demand for capacity for each channel.

The capacity of a channel can be controlled by varying the bandwidth of the channel, for example, by varying the number of sub-channels allocated to the channel.

In a closely related aspect, the invention provides apparatus for use in a multidirectional communication system, the apparatus comprising means for controlling the relative capacities of first and second channels of the system in response to the demand for capacity for at least one of the channels.

In yet further closely related aspect, the invention provides a method of operating a multi-directional communication system, the method comprising controlling the relative capacities of first and second channels of the system in response to the demand for capacity for at least one of the channels.

In a further aspect, the invention relates to an OFDM system, and to synchronisation techniques for improving operation.

Referring again to U.S. Pat. No. 5,668,802, special time synchronisation schemes are described in order to permit the transmitters at the opposite ends of the subscriber line to transmit a data frame according to a common "line" timing. A first scheme involves adding a post-cursor to a data frame to repeat data from the beginning of the frame; a second scheme involves a master station commanding the slave to introduce "slip" between the reception and transmission frames (at the slave end).

In developing this aspect of the present invention, it was appreciated that interference between OFDM transmissions in each direction can be reduced by synchronising each of the OFDM transmitters/receivers using a common source.

In accordance with this aspect, the invention provides an OFDM communication system comprising:

a first OFDM device at a first station;

a second OFDM device at a second station;

means at the first station for sending a frequency synchronisation signal from the first station to the second station; and means at the second station for receiving the frequency synchronisation signal and for frequency synchronising the second OFDM device using the frequency synchronisation signal.

Each OFDM device may be a transceiver having a receive and a transmit function, or a circuit having only a receive function or only a transmit function.

Preferably, the synchronisation signal is derived from the frequency used by the first OFDM device, or the first OFDM device is also frequency synchronised to the synchronisation signal.

The frequency synchronisation signal may, for example, comprise a burst at a predetermined frequency, or a synchronisation code or symbol from which synchronisation information can be derived.

The frequency synchronisation signal may also represent timing information usable at the second station to time synchronise the second station to the first station. For example, the timing information may comprise the leading, or trailing, edge of the burst signal, and define a precise reference point in time relative to transmission of OFDM "symbols". In the case of a synchronisation code, synchronisation can be monitored by detecting the energy from the FFT circuit; the energy will be a maximum when receiver is correctly time synchronised.

With this aspect of the invention, it is possible to reduce the effects of design and operating tolerances which might normally cause slight differences in the timing or frequency associated with each independent OFDM device. Such small variations would normally tend to reduce the true orthogonality of the different sub-carriers generated or used by the different OFDM devices, and hence produce a degree of interference between the sub-carriers. By improving the overall synchronisation, a high degree of orthogonality can be attained, leading to improved isolation between the transmission and reception sub-carriers. Such a signal may be suitable for transmission over long transmission distances.

In a closely related aspect, the invention provides apparatus for use in a communication system, the apparatus comprising a first OFDM device for communicating with a second remote OFDM device at a remote station, and means for generating a frequency synchronisation signal for transmission to the remote station to facilitate frequency synchronisation of the second OFDM device to the first OFDM device.

In a closely related aspect, the invention provides apparatus for use in a communication system, the apparatus comprising a first OFDM device for communicating with a second remote OFDM device at a remote station, means for receiving from the remote station a frequency synchronisation signal indicative of the frequency used by the second OFDM device, and means for synchronising a frequency of the first OFDM device to the received synchronisation signal.

In a closely related aspect, the invention provides a method of operating a communication system comprising a first OFDM device at a first station and a second OFDM device at a second station, the method comprising:

generating at the first station, a frequency synchronisation signal;

transmitting the frequency synchronisation signal to the second station; and using the received frequency synchronisation signal at the second station to frequency synchronise the second OFDM device.

In a further closely related aspect, the invention provides a method of operating a first OFDM station for communication with a second remote OFDM station, the method comprising:

generating at the first station, a frequency synchronisation signal representative of a reference frequency used in the first OFDM station; and transmitting the frequency synchronisation signal from the first station for communication to the second station to enable frequency synchronisation of the circuitry in the OFDM station relative to the OFDM circuitry at the first station.

In a further closely related aspect, the invention provides a method of operating a first OFDM station for communication with a second remote OFDM station, the method comprising:

receiving at the first station a frequency synchronisation signal representative of a reference frequency used with the second OFDM station; and using the received frequency synchronisation signal to synchronise the first OFDM station at a corresponding operation frequency.

In a yet further aspect, the invention relates to communication over a network consisting of three or more stations.

In accordance with this aspect, the invention provides an OFDM communication network comprising first, second and third communication nodes, wherein the OFDM sub-channels are distributed for simultaneous communication from the first node to the second node, and from the third node to the first or second node.

In developing this aspect of the invention, it was appreciated that multiplexed communication may be achieved by allocating the OFDM sub-channels to allow simultaneous communication between first, second and third nodes in a network. The principles of two-way communication can thus be expanded to provide communication channels between more than two nodes, stations, or modems.

The sub-channel allocations may be predetermined such that the capacities are fixed, and are not variable in use. Alternatively, the controllable sub-channel allocation techniques discussed above may be employed to provide variable capacities to suit demand.

The frequency synchronisation techniques discussed above may also be employed to improve synchronisation between the different OFDM circuits at each node. Generally one node will be designated as a master, and all other nodes will be designated as slaves to follow the synchronisation signal generated by the master.

BRIEF DESCRIPTION OF THE DRAWINGS

Embodiments of the invention are now described, by way of example only, with reference to the accompanying drawings, in which.

DESCRIPTION OF PREFERRED EMBODIMENTS

Figure 1:
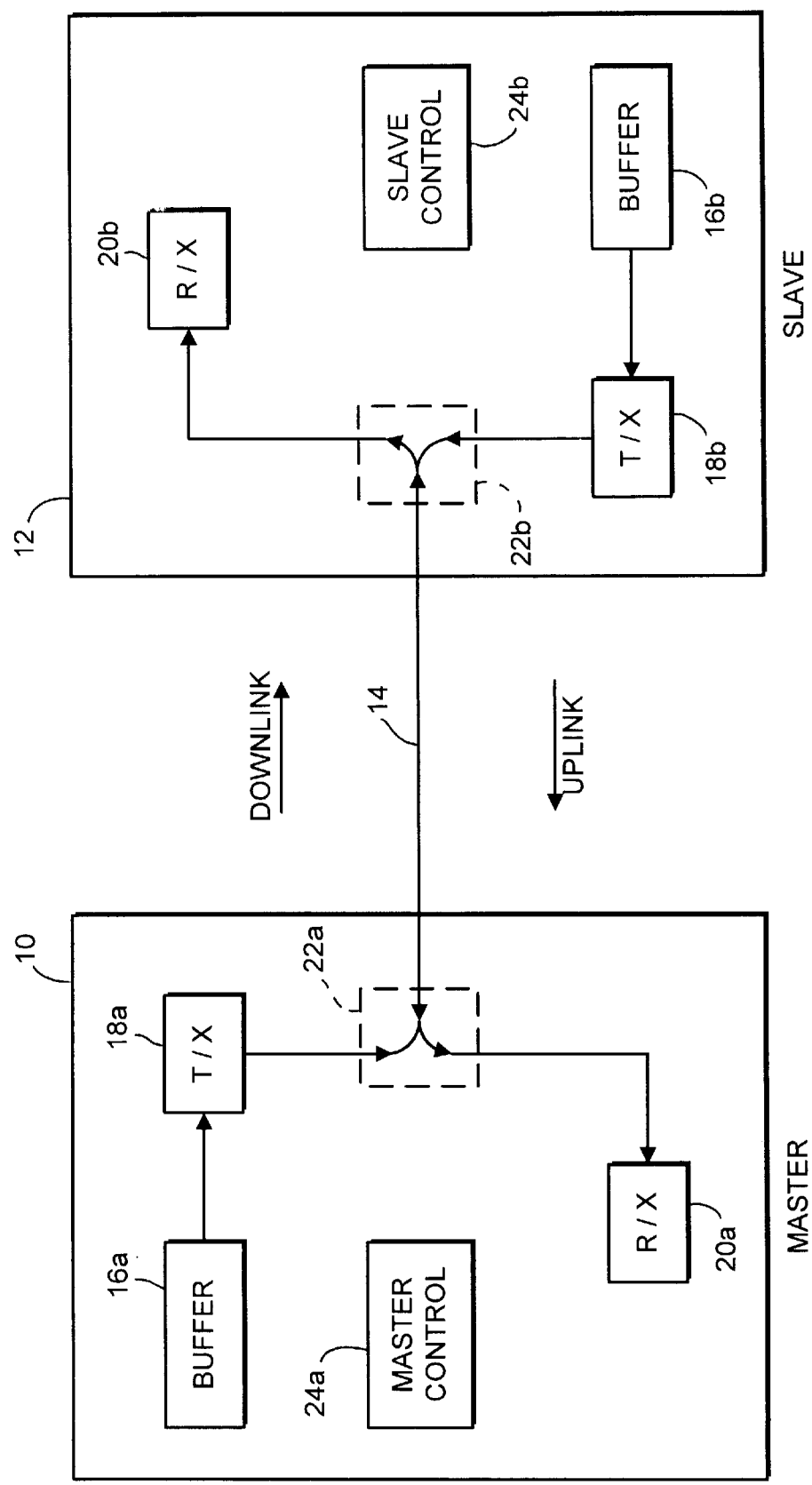
FIG. 1 is a schematic block diagram of elements of a duplex communication system.

FIG. 1 shows a system for communication between a first modem 10 and a second modem 12. The first modem 10 is referred to as the master, and the second modem 12 is referred to as the slave, with respect to control over communication characteristics between the two, as described further below. In the case of communication over a subscriber line, the master modem 10 will usually be at the exchange, and the slave modem 12 would be situated at a subscriber location. The communication channel from the master modem to the slave is referred to herein as the downlink channel, and the communication channel from the slave to the master is referred to herein as the uplink channel.

The modems 10 and 12 are linked by a communication medium which, in this embodiment, is a conventional twisted copper line 14. However, in the other embodiments, other mediums may be used such as optical fibres, infra-red, radio waves or microwaves.

Each modem includes an input buffer 16 (16a and 16b) for buffering data to be transmitted, a transmitter 18 (18a and 18b) for encoding data from the buffer 16 (16a and 16b) and transmitting it to the line 14, and a receiver 20 (20a and 20b) for receiving information from the line 14. Also shown is an optional line filter 22 (22a and 22b) for assisting isolation of the received signals from the transmitted signals within each modem. The function, and need, for such a filter is discussed further below.

Each modem also comprises a control circuit 24 (24a and 24b) for controlling operation of the transmitter 18, receiver 20, and line filter 22, as desired. The slave control circuit 24b is responsive to information received through the line 14 from the master control circuit 24a.

Figure 2:
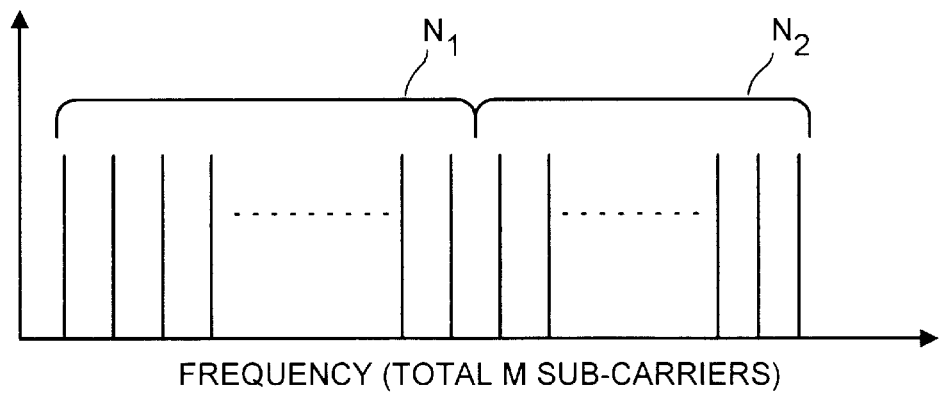
FIG. 2 is a schematic diagram illustrating an OFDM signal.

Although many different types of communication may be used with the invention, the preferred embodiments employ OFDM and, in particular, COFDM. Referring to FIG. 2, the OFDM signals on line 14 consist of a number M of sub-carriers, the sub-carriers being spaced apart by the baud rate frequency (or an integer multiple thereof). A first group $N_1$ of the M sub-carriers is allocated for the downlink channel (i.e. for communication from the transmitter 18a to the receiver 20b), and a second group $N_2$ of the M sub-carriers is allocated for the uplink channel (i.e. for communication from the transmitter 18b to the receiver 20a).

Figure 3:
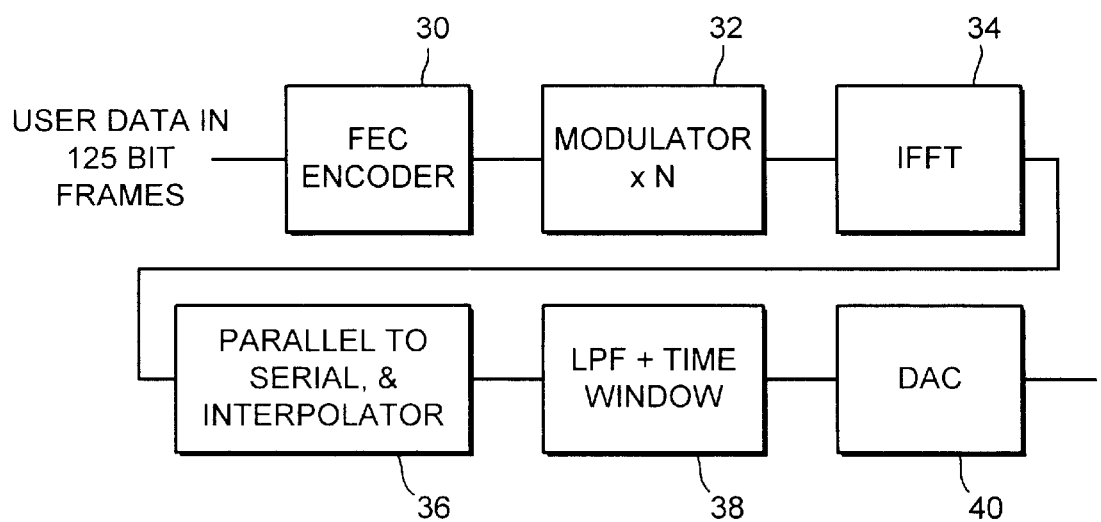
FIG. 3 is a schematic block diagram showing a transmitter for use in the system of FIG. 1.

Referring to FIG. 3, the transmitter 18a comprises a Forward Error Correction (FEC) encoder 30 for coding the incoming data frames with redundant error-correction coding. The coded output is inputted to $N_1$ channels of a multi-channel modulator 32 for encoding the signal into $N_1$ sub-channels. The modulator may, for example, be a QAM modulator, or a CAP modulator (which would provide a more rounded constellation having a similar number of constellation points). In order to convert the $N_1$ sub-channel signals into respective $N_1$ sub-carrier frequency signals, an inverse fast fourier transform (iFFT) circuit 34 is used. In particular, the $N_1$ modulated sub-channels are fed to the respective iFFT inputs which correspond to the particular sub-carrier frequencies allocated to the downlink channel. No signal is applied to the remaining iFFT inputs corresponding to the $N_2$ sub-carriers, such that the iFFT circuit 34 in the transmitter 18a does not generate any output in the $N_2$ sub-carriers allocated to the uplink channel.

The sub-carrier outputs from the iFFT circuit 34 are fed into a parallel/serial interpolator 36 for conversion into a serial signal. If desired, in order to reduce the effect of noise, only the desired $N_1$ sub-carriers may be selected for the parallel/serial interpolator using pre-filtering means (not shown), so that any noise introduced on the other sub-carriers in the iFFT circuit 34 does not reach the communication line 14.

The output from the parallel/serial interpolator 36 is passed through a low pass filter/time window circuit 38, the function of which will be described further below. The output from the circuit 38 is fed into a digital-to-analogue converter (DAC) 40 to convert the signals to analogue form for transmission to the communication line 14.

The transmitter 18b in the slave modem is similar to that described above, except that the signals are modulated in $N_2$ sub-channels, and the modulated signals are fed to the respective iFFT inputs which correspond to the $N_2$ sub-carrier frequencies allocated to the uplink channel. No signals are applied to the iFFT inputs which correspond to the $N_1$ sub-carrier frequencies allocated to the downlink channel. Moreover, in one embodiment in which synchronisation of the slave transmitter 18b is used, a synchronisation input 19 (FIG. 4) is provided to the slave transmitter. The synchronisation input is used to control time and frequency synchronisation of the parallel to serial converter and interpolator 36 (FIG. 3).

Since the sub-carrier frequencies are orthogonal, there is theoretically no interference between the different sub-carriers within each channel, or between sub-carriers carrying information in different channels. The signals can be decoded within each modem by reversing the operation carried out by the "opposite" transmitter.

Figure 4:
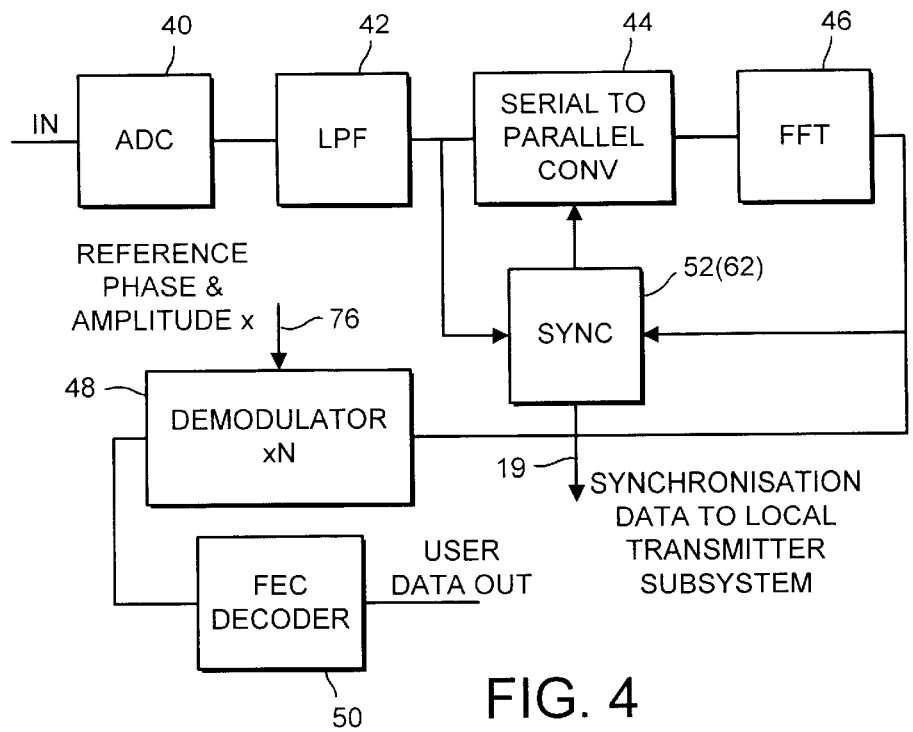
FIG. 4 is a schematic block diagram showing a receiver for use in the system of FIG. 1.

Referring to FIGS. 1 and 4, the receiver 20b (in the slave modem 12) comprises an analogue-to digital converter (ADC) 40 followed by a low-pass digital filter 42. The digital signal is converted from serial form back to parallel form by a serial-to-parallel converter 44, and the parallel signal is supplied to inputs of a fast fourier transform (FFT) circuit 46. In the FFT circuit, the incoming signals are transformed into a plurality of sub-channel signals which include the $N_1$ wanted sub-channel signals transmitted by the opposite transmitter 18b, and also the $N_2$ unwanted sub-channel signals transmitted by the modem's own transmitter 18a. However, since the $N_2$ unwanted sub-channel signals will appear at different FFT outputs from the $N_1$ wanted sub-channels, the former (i.e. $N_2$ ) can simply be ignored leaving only the wanted signals. The desired $N_1$ sub-channel signals are passed through a multi-channel demodulator 48, and through an FEC decoder 50, to recover the original data signal (with error correction if necessary).

In order to convert the serial signal into parallel form, the serial-to-parallel converter 44 must be correctly synchronised with the incoming signal. To achieve this, the serial-to-parallel converter 44 is controlled by a synchronisation circuit which time aligns the serial-to-parallel conversion window. For example, the synchronisation circuit 52 may operate by monitoring the total energy in the FFT output signals; the energy will be a maximum when the serial-to-parallel converter 44 is correctly aligned. Alternatively, the synchronisation circuit 52 may compare the phase and/or amplitude of certain sub-channels at the FFT output with known phase and amplitude values expected during synchronisation frames (see 98 in FIG. 11).

Additionally, the synchronisation circuit may provide synchronisation for the slave transmitter 18a, in particular the parallel to serial converter and interpolator 36 (FIG. 3).

The receiver 20a comprises similar circuitry to that of receiver 20b, except that the wanted $N_2$ sub channel signals are fed through the demodulator, and the unwanted $N_1$ sub-channel signals are ignored.

In each modem, the purpose of the line filter 22 is to attenuate, in the signals fed to the receiver 20, the relatively strong locally transmitted signal relative to the weaker distant signal received from the communication line 14. Depending on the working precision of the ADC 40, if the local signal is too strong, then it may "swamp" the wanted received signal in the ADC 40. The ADC working resolution (or ENOB - effective number of bits) will generally be less than the theoretical precision, due to noise and distortion in the ADC. The working precision of real world ADC's for OFDM applications is mainly reduced by integral non-linearity (INL), third order intermodulation distortion (IMD) and aperture jitter. If the ADC has a sufficiently great working precision to convert the weak distant signal even in the presence of the strong local signal, then a simpler filter 22 may be employed, or the filter might be omitted altogether. For example, the line filter may typically be omitted if the ADC has an ENOB of 11 bits or greater.

Allocation of Sub-Carriers

Figure 5:
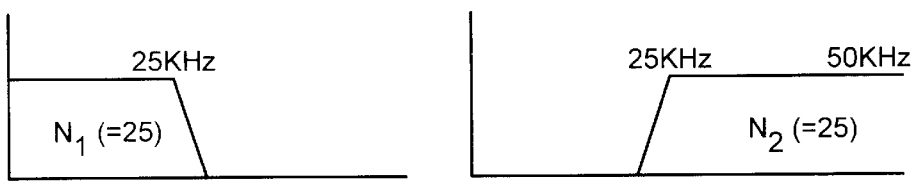
FIGS. 5 and 6 are schematic drawings showing bandwidth allocated for communication under different conditions.

In one possible arrangement, the allocation of the sub-carriers between the uplink and downlink channels may be fixed. For example, for full (symmetric) duplex operation, each channel may be allocated with 25 sub-carriers, for example as illustrated in FIG. 5. In FIG. 5, each channel consists of a contiguous group of adjacent sub-carriers, resulting in two distinct bands for the uplink and downlink directions. Such grouping together can simplify the filter characteristic of the line filter 22 (if required). However, other embodiments may employ interleaved allocation of the sub-carriers, so that the uplink and downlink channels do not form two distinct frequency bands (see, for example, FIGS. 7 and 8).

Figure 6:
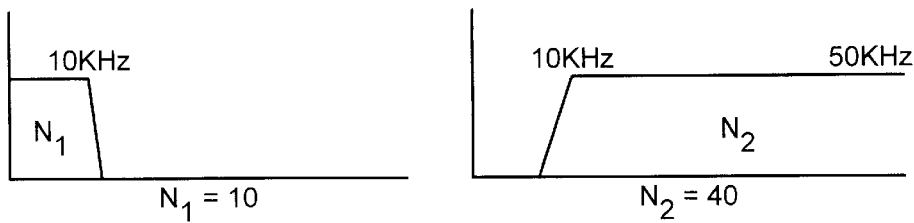

For asymmetrical duplex operation (i.e. where one channel has a greater capacity than the other), a greater number of sub-carriers may be allocated to one channel than to the other, for example as illustrated in FIG. 6.

Further particularly important advantages can be obtained in the relative capacities of the channels are not fixed, but are made controllable, by enabling control of the number of sub-carriers allocated to each channel. In one form, the capacities may be variable by allocating sub-carriers individually; in another form, the capacities may be "selectable" by selecting one of a plurality of pre-defined sub-carrier allocations.

The allocation of the channels may be controlled by the control circuit 24a in the master modem 10 (also referred to herein as the master control circuit 24a). In order to avoid conflicts, the control circuit 24b in the slave modem (also referred to herein as the slave control circuit 24b) would be made to follow the allocation defined by the master control circuit 24a. Allocation instructions may, for example, be communicated from the master modem 10 to the slave modem 12 through the communication line as part of the data transmission format, or as special control blocks in the transmission format.

In a particularly preferred embodiment, the slave control circuit 24b is operable to monitor the backlog of data awaiting transmission in the input buffer 16b in the slave modem 12. This information can be transmitted back to the master modem 10 periodically and/or should the backlog exceed a predetermined threshold. The master control circuit 24 receives the information from the slave control circuit and also is operable to monitor the backlog of data awaiting transmission in the local input buffer 16a in the master modem. The size of the backlog in each input buffer is indicative of the "demand" for capacity in each channel. Using this information, the master control circuit 24a is operable to re-allocate the channel capacities adaptively to improve communication efficiency in each direction, such that the relative capacities of the uplink and downlink channels matches the demand in either direction pro-rata.

In order to allocate sub-carriers (or sub-channels) each control circuit 24 is operable to provide sub-channel information to: the modulator 32 to control the number of modulation channels used for transmission; optionally to the iFFT circuit 34 to control the iFFT inputs used for transmission; to the demodulator 48 to control the selection and number of channels used for demodulation (in order to demodulate only the wanted signals); and to the line filter 22 (if used) to control the attenuation characteristics to suit the transmission and reception bandwidths. It will be appreciated that the sub-channel control information generated in one modem will be opposite to that generated in the other modem.

Figure 7:
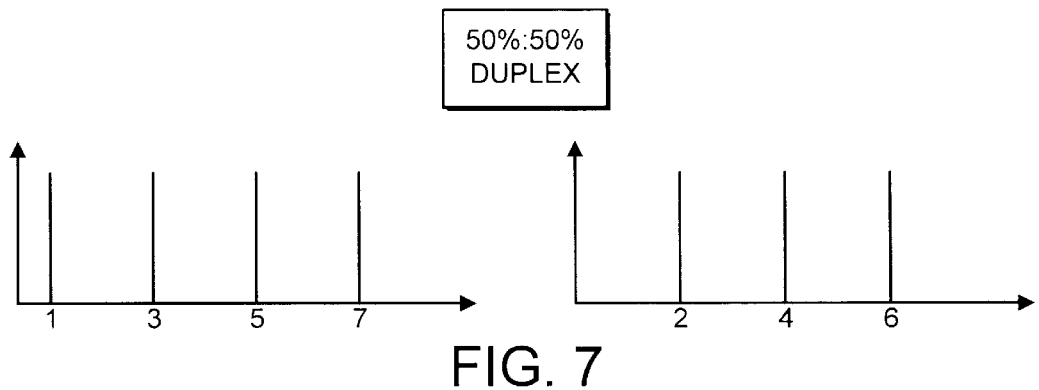
FIGS. 7 and 8 are schematic drawings showing an alternative channel allocation scheme.
Figure 8:
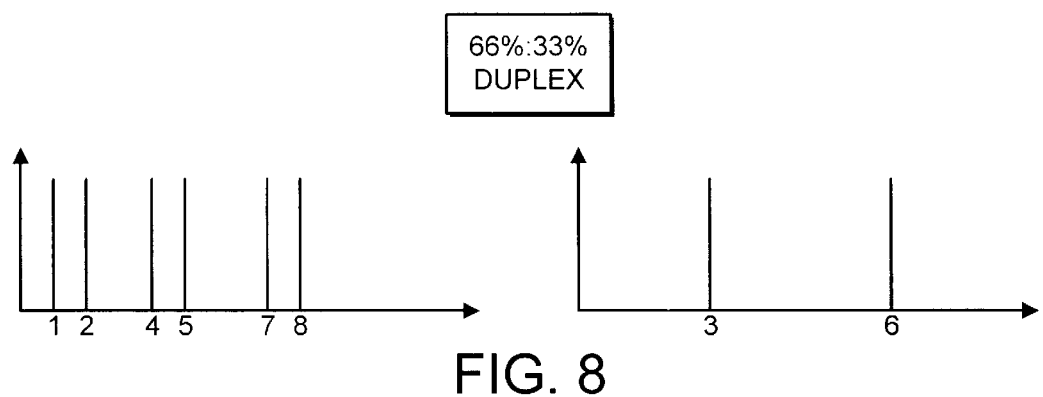

FIGS. 7 and 8 illustrate an alternative scheme for allocating sub-carriers in which the sub-carriers of the two channels are interleaved. This may provide advantages in enabling the channels to have generally similar frequency characteristics, but the design of the line filter 22 if needed in the circuit, would have to be considerably more complicated to accommodate the necessary variable narrow band filtering.

Timing and Synchronisation Embodiment

The uplink and downlink channels will only be truly isolated if the sub-carriers in each channel are orthogonal. In general this is difficult to accomplish with some of the sub-carriers being generated by one transmitter 18a, and others being generated by a completely different transmitter 18b. Small frequency variations may occur within the design and operating tolerances of each transmitter, and further variations may occur due to local conditions, such as temperature, noise or interference. Furthermore, the modems might be manufactured by different manufacturers.

Particularly important advantages can be obtained by synchronising the slave modem 12 to the master modem 10 both in terms of frequency generation and timing. In a preferred embodiment, the master transmitter 18a is operable to transmit synchronisation signals via the communication line 14 to the slave modem 12. The synchronisation signals may, for example, be in the form of frequency burst signals, the frequency of which represents a master reference frequency to which the iFFT circuit 34b and the FFT circuit 46b in the slave modem 12 can be locked.

In a preferred form, the synchronisation signal is in the form a synchronisation symbols transmitted as part of a frame of data. The synchronisation circuit 52 in the slave modem comprises a sub-circuit 62 for receiving the synchronisation symbols, and for generating a master clock signal which is frequency locked to the incoming synchronisation symbols. As explained hereinbefore, synchronisation may be accomplished by comparing the phase and/or amplitude of certain sub-channels at the FFT output with known phase and amplitude values expected during reception of the synchronisation symbols. An example data format including such synchronisation signals is described further below.

The frequency and timing information derived by the synchronisation circuit 52 is fed to the slave transmitter 18b to synchronise the slave transmitter to the same frequency and timing as the master transmitter 18a. The orthogonality of the sub carrier signals transmitted by the two transmitters 18a and 18b can thus be improved, providing improved isolation between the channels, and allowing data transmission over longer transmission paths than many existing techniques.

This technique can be used independently of the sub-carrier allocation techniques discussed above, but advantageously, the two techniques can be used together.

Multiplexed Network Communication

The above embodiments illustrate communication in an uplink direction and a downlink direction between two different modems. In a particularly preferred embodiment, the above principles are applied to a network including three or more modems.

Figure 9:
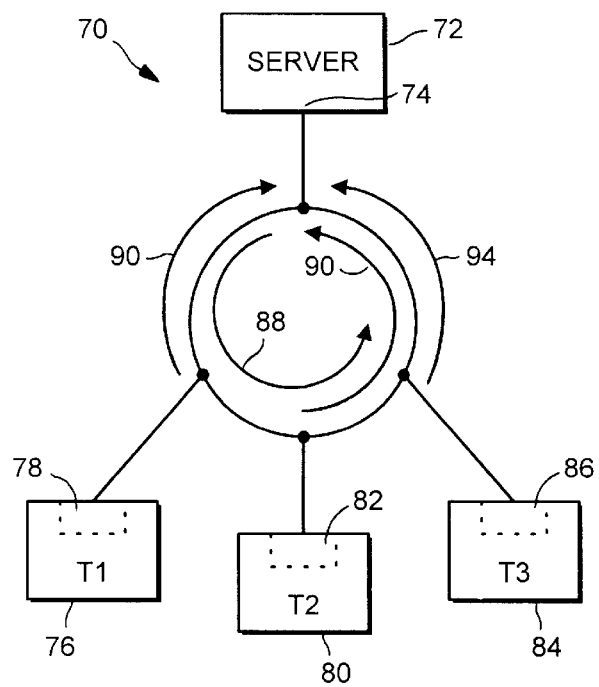
FIG. 9 is a schematic drawing showing communication on a multi-station network.

Referring to FIG. 9, the network 70 comprises server 72 containing a master modem 74, a first terminal 76 containing a first slave modem 78, a second terminal 80 containing a second slave modem 82 and a third terminal 84 containing a third slave modem 86. The master modem 74 is similar to the master modem 10 described hereinbefore, and each slave modem 78, 82 and 86 is similar to the slave modem 12 described hereinbefore. By allocating the sub-carriers between the different modems, multi-directional network communication can be achieved without risking conflicts on the network communication line.

Figure 10:
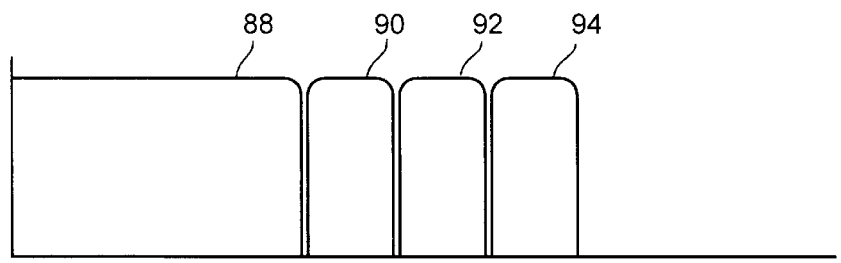
FIG. 10 is a schematic illustration of channel allocation for the network of FIG. 9.
Figure 11:
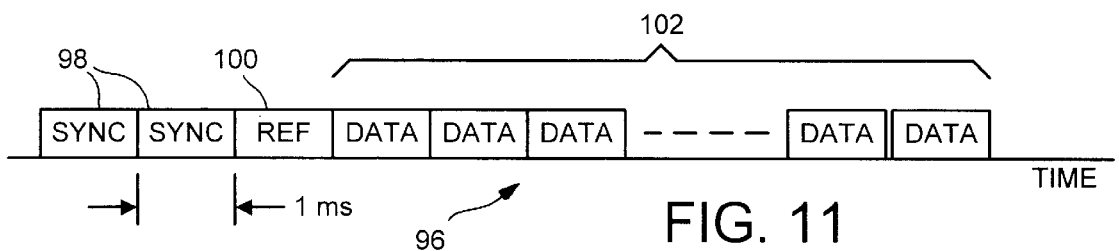
FIG. 11 is a schematic drawing of the structure of a transmission frame of data.

Referring to FIGS. 10 and 11, a server channel 88 is defined for transmission from the server 72 to each of the terminals 76, 80 and 84. A first terminal channel 90 is defined for transmission from the first terminal 76 to the server 72. Second and third terminal channels 92 and 94 are similarly defined for transmission from the second and third terminals 80 and 84, respectively, to the server 72. Normally, the server channel 88 will be expected to carry much more information than the terminal channels 90, 92 and 94. Accordingly, the server channel 88 can be allocated a greater number of sub-carriers than the server channels to provide greatest capacity in the server channel.

Although the above embodiment can be used independently of the controllable channel allocation techniques and synchronisation techniques described previously, particular advantages can be achieved by employing one or both of these other techniques together. In particular, controllable channel allocation can enable the efficiency on the network to be adapted to the network data traffic. Furthermore, variable allocation of channels can be used as a means for addressing data from the server to one or more of the terminals. The synchronisation techniques will also be especially useful in enabling the circuits of the multiple modems to be synchronised to a single frequency, phase and time reference.

Example Data Frame Structure

In the example modem considered in FIGS. 1, 3 and 4, the transmitters could transmit a sequence of symbols called a frame, as illustrated in FIG. 11. Each frame would consist of many symbols 96, and each symbol would contain 300 bits, equivalent to about 38 bytes, and last 1 millisecond (i.e. a symbol rate of 1 K symbols/sec). Each frame typically starts with one or more synchronisation symbols 98 to allow the synchronisation circuit 52 to synchronise itself to the incoming signal. The synchronisation symbols may be followed by a predetermined reference symbol 100 which would contain a reference amplitude and phase modulation for the sub-carriers. The reference symbol would allow the receiver to measure the attenuation and phase rotation introduced by the communication medium at each sub-carrier frequency, based on the receiver's predetermined knowledge of the originally transmitted contents of the reference signal. The measured attenuations and phase rotations can be fed to input 76 of the demodulator 48 to normalise the sub-carrier signals for demodulation. The synchronisation and reference symbols are then typically followed by a number of payload symbols 102 representing the data to be transmitted in the frame. The number of payload symbols transmitted in a single frame would depend on the latency tolerance and other parameters of the communication system. The larger the number of payload symbols in each frame, then the greater the transmission efficiency.

It is emphasised that the above frame structure is merely illustrative. An alternative arrangement more suited to connection orientated services would consist of an initial synchronisation phase where the modems exchange a significant number of short synchronisation protocol data units (PDU's) during connection set-up to achieve accurate synchronisation which would then be valid for, for example, a few seconds, or for the lifetime of the connection. After connection set-up the link traffic could consist entirely of data frames without synchronisation or reference symbols, thus reducing this overhead significantly and achieving a throughput advantage.

It will be appreciated that the foregoing description is merely illustrative of preferred embodiments of the invention, and that many modifications may be made within the scope of the invention. Features believed to be of particular importance are recited in the appended claims. However, the applicant claims protection for any novel feature or combination of features described herein and/or illustrated in the accompanying drawings, irrespective of whether emphasis is placed thereon.

What is claimed is:

1. An orthogonal frequency division modulation (OFDM) communication system comprising:
    a first OFDM device at a first station, the first OFDM device configured to (i) add a synchronisation signal to a plurality of data signals, (ii) generate a plurality of sub-carrier signals in response to modulating the synchronisation signal and the data signals, and (iii) generate a plurality of sub-carrier frequency signals in response to an inverse fast fourier transformation of the sub-carrier signals; and
    a second OFDM device at a second station, the second OFDM device configured to (i) generate the sub-carrier signals in response to a fast fourier transformation of the sub-carrier frequency signals, (ii) generate the synchronisation signal and the data signals in response to demodulating the sub-carrier signals, and (iii) synchronize a clock to the synchronisation signal.

2. The system according to claim 1, wherein the synchronisation signal comprises a plurality of synchronisation codes.

3. The system according to claim 1, wherein the synchronisation signal further comprises a reference signal containing at least one of a reference amplitude and a reference phase.

4. The system according to claim 1, wherein the synchronisation signal further represents timing information to facilitate time synchronisation of the second OFDM device to the first OFDM device, for alignment of symbol transmission to the first OFDM device from the second OFDM device.

5. The system according to claim 1, wherein the synchronisation signal is transmitted as part of a frame of transmitted data.

6. The system according to claim 1, wherein the synchronisation signal is transmitted intermittently between packets of data.

7. The system according to claim 1, wherein the system comprises at least three OFDM stations.

8. An apparatus for use in an OFDM communication system, the apparatus comprising a first OFDM device for communicating with a second remote OFDM device at a remote station, the first OFDM device configured to (i) add a synchronisation signal to a plurality of data signals, (ii) generate a plurality of sub-carrier signals in response to modulating the synchronisation signal and the data signals, and (iii) generate a plurality of sub-carrier frequency signals in response to an inverse fast fourier transformation of the sub-carrier signals for transmission to the remote station.

9. The apparatus according to claim 8, wherein the synchronisation signal comprises a plurality of synchronisation codes.

10. The apparatus according to claim 8, wherein the synchronisation signal comprises a reference signal containing at least one of a reference amplitude and a reference phase.

11. The apparatus according to claim 8, wherein the synchronisation signal further represents timing information to facilitate time synchronisation of the second OFDM device to the first OFDM device, for alignment of symbol transmission to the first OFDM device from the second OFDM device.

12. The apparatus according to claim 8, wherein the synchronisation signal is transmitted as part of a frame of transmitted data.

13. The apparatus according to claim 12, wherein the synchronisation signal is transmitted intermittently between packets of data.

14. An apparatus for use in a communication system, the apparatus comprising a first OFDM device for communicating with a second remote OFDM device at a remote station, the first OFDM device configured to (i) generate a plurality of sub-channel signals in response to a fast fourier transformation of a plurality of sub-channel frequency signals received from the second OFDM device, (ii) generate a synchronisation signal and a plurality of data signals in response to demodulating the sub-carrier signals, and (iii) synchronize a clock to the synchronisation signal.

15. The apparatus according to claim 14, wherein the first OFDM device comprises:
    an OFDM receiver;
    an OFDM transmitter; and
    a synchronisation circuit for synchronising a transmission frequency of the OFDM transmitter according to the synchronisation signal.

16. The apparatus according to claim 15, further comprising a demodulator configured to normalize the data signals in response to a reference signal (i) containing at least one of a reference amplitude and a reference phase and (ii) incorporated within the sub-channel reference signals.

17. A method of operating a communication system comprising a first OFDM device at a first station and a second OFDM device at a second station, the method comprising:
    (A) adding a synchronisation signal to a plurality of data signals at the first station;
    (B) generating a plurality of sub-carrier signals in response to modulating the synchronisation signal and the data signals;
    (C) generating a plurality of sub-carrier frequency signals in response to an inverse fast fourier transformation of the sub-carrier signals;
    (D) transmitting the sub-carrier frequency signals to the second station;
    (E) generating the sub-carrier signals in response to a fast fourier transformation of the sub-carrier frequency signals;
    (F) generating the synchronisation signal and the data signals in response to demodulating the sub-carrier signals; and
    (G) using the synchronisation signal at the second station to synchronize a clock in the second OFDM device.

18. A method of operating a first OFDM station for communication with a second remote OFDM station, the method comprising:
    (A) adding a synchronisation signal to a plurality of data signals at the first station;
    (B) generating a plurality of sub-carrier signals in response to modulating the synchronisation signal and the data signals;

(C) generating a plurality of sub-carrier frequency signals in response to an inverse fast fourier transformation of the sub-carrier signals; and (D) transmitting the sub-carrier frequency signals to the second station.

19. A method of operating a first OFDM station for communication with a second remote OFDM station, the method comprising:

(A) receiving at the first station a plurality of sub-channel frequency signals transmitted from the second station;

(B) generating a plurality of sub-carrier signals in response to a fast fourier transformation of the sub-carrier frequency signals;

(C) generating a synchronisation signal and a plurality of data signals in response to demodulating the sub-carrier signals; and (D) using the synchronisation signal to synchronise a clock in the first OFDM device.

* * * * *